(12) United States Patent
Reder et al.

(10) Patent No.: US 8,376,147 B2
(45) Date of Patent: Feb. 19, 2013

(54) FILTER CARTRIDGE

(75) Inventors: Ernst Reder, Hahnheim (DE); Ingo Mohr, Idstein (DE); Klaus-Peter Weber, Bad Soden Salmunster (DE); Jorg Lindloff, Taunusstein (DE)

(73) Assignee: BRITA GmbH, Taunusstein (DE)

( * ) Notice: Subject to any disclaimer, the term of this patent is extended or adjusted under 35 U.S.C. 154(b) by 699 days.

(21) Appl. No.: 10/520,733

(22) PCT Filed: Jul. 9, 2003

(86) PCT No.: PCT/EP03/07402
§ 371 (c)(1),
(2), (4) Date: Jan. 10, 2005

(87) PCT Pub. No.: WO2004/007047
PCT Pub. Date: Jan. 22, 2004

(65) Prior Publication Data
US 2006/0062567 A1 Mar. 23, 2006

(30) Foreign Application Priority Data
Jul. 10, 2002 (DE) .................................. 102 31 095

(51) Int. Cl.
*B01D 35/00* (2006.01)
*B01D 35/30* (2006.01)
*B01D 35/28* (2006.01)

(52) U.S. Cl. .......................... 210/435; 210/440; 210/455

(58) Field of Classification Search .................... 210/94, 210/95, 443, 450; 220/600, 660, 602, 662, 220/581, 586, 592, 213, 240, 740, 643, 721, 220/DIG. 1; D9/780; 49/373; 206/439, 206/474; 184/88.2; 137/296
See application file for complete search history.

(56) References Cited

U.S. PATENT DOCUMENTS
1,371,530 A * 3/1921 Wagner .......................... 220/610
(Continued)

FOREIGN PATENT DOCUMENTS
GB 1259154 5/1969
JP S58-124864 3/1985
(Continued)

OTHER PUBLICATIONS
Kenji, Saruta, "Water Purifying Cartridge," European Patent Office, Patent Abstracts of Japan, Publication No. 10085730.

Primary Examiner — Benjamin Kurtz
(74) Attorney, Agent, or Firm — Hudak, Shunk & Farine Co. LPA (57) ABSTRACT

The invention relates to a filter cartridge (1) which comprises a firmly fixed lid (10) and has a long service life. Said lid (10) is embodied in such a way that the bottom (11) of the lid extends towards the peripheral wall (3) of the cartridge container to join the lateral wall (16) of the lid, by means of an inwardly curved edge section (14), the curved edge section (14) and the lateral wall (16) in the form of a strip joining in the forming region to form an inwardly tapered common wall section (15). In this way, the region fixing the lateral wall (16) to the peripheral wall (3) is subjected only to a tensile load, minimizing the risk of shear fracture, and the inner pressure in the region of the common wall section (15) presses the wall section against the peripheral wall (3), thus exerting an additional sealing force.

24 Claims, 5 Drawing Sheets

U.S. PATENT DOCUMENTS

| | | | | |
|---|---|---|---|---|
| 2,294,261 A | * | 8/1942 | Wilkinson | 220/327 |
| 2,904,182 A | * | 9/1959 | Baumann | 210/234 |
| 3,627,612 A | * | 12/1971 | Greer | 156/306.9 |
| 3,952,904 A | * | 4/1976 | Verlinden | 220/4.05 |
| 4,109,820 A | * | 8/1978 | Stifano | 220/240 |
| 5,249,701 A | | 10/1993 | Daehn | 220/612 |
| 5,301,958 A | * | 4/1994 | Covington | 277/641 |
| 5,690,814 A | * | 11/1997 | Holt | 210/94 |
| 5,830,348 A | * | 11/1998 | Vannoy et al. | 210/109 |
| 6,319,415 B1 | | 11/2001 | Schade | 210/767 |
| 2001/0000894 A1 | * | 5/2001 | Gizowski et al. | 210/435 |

FOREIGN PATENT DOCUMENTS

WO      WO 02/38247 A1 *    5/2002

* cited by examiner

FILTER CARTRIDGE

The invention relates to a filter cartridge which comprises a cartridge container with a filter material, with a bottom wall and a peripheral wall, and with a lid, which durably shuts the cartridge container, which has a lid bottom and a strip-shaped lateral wall along its perimeter, which is firmly fixed on the inner side of the cartridge container.

Filter cartridges are components of filter devices, in particular of water filters, and are inserted as replaceable components in pressure-proof outer containers. The outer contour of the filter cartridge corresponds essentially to the inner contour of the outer container, so that it withstands the pressure acting on the cartridge wall due to the fluid to be filtered. Therefore, the bottom wall and the peripheral wall of the filter cartridge need not have a design that is stable under pressure. However, the situation is different with the cartridge lid, because, in general, there is recess between the cartridge lid and the lid of the outer container. This recess results possibly due to the circumstance that the lid is inserted in the cartridge container and is fixed at the inner side of the wall of the cartridge container, whereby the encircling lateral wall of the cartridge lid protrudes upward against the bottom wall of the cartridge container. This kind of embodiment of the cartridge lid requires not only a design that is stable under the action of pressure on the lid, but also a fastening of the lid on the cartridge container that is stable against the action of pressure, so as to prevent leakages.

The lid bottom forms almost a right angle, projecting upward, with the lateral wall that is built along its periphery, as, for example, it is described in DE 199 58 649.7. Due to the internal pressure, the upward oriented forces act on the lid bottom, which bulges upward and is stretched as its result. This leads to the consequence that, on the lateral wall, in the region connected with the lid bottom, radial, inward oriented, forces act, which leads to the loosening of the lateral wall and to formation of cracks in the connecting region.

The large number of pressure impacts, which act upon the cartridge and the cartridge lid in course of the operation of the filter device, can lead to leakages in long term, necessitating complete replacement of the filter cartridge as a whole.

At present a solution that can solve this problem does not exist.

In the utility model DE 297 15 504 U1, a casing for the air purifier element is known, which is supposed to ensure sufficient stability under variable pressure conditions. Insofar as the current status of the technology is concerned, an air filter housing is mentioned in that prior printed publication, in which the upper part has a bulge oriented outwards. In contrast to that, in this document, it is proposed that the bulge be oriented inwards, so that the air pulsations, which result from pressure fluctuations, are dampened due to the relatively firm border region. How this lid part is fixed in the casing, or whether it is an integral part of the casing, is not reported.

In EP 0 861 682 B1, a lid for filter casing is described which shows less suction effect when the filter casing is taken off and lets in less air into the interior of the filter casing when it is
put on. The aforesaid lid is a removable lid, which, as the whole, has a slightly bulging bottom, without curved edge section, and it has mantle-shaped lateral wall along its perimeter, which has a matching form according to the periphery and extends in the direction of its longitudinal axis on both sides of the bottom and gives the lid the form of a bowl that is open below. On its lower side, external screw threads are provided on its lateral wall, which, acting in combination with the corresponding internal screw threads of the filter housing, form the means for fastening, so that the lid is therewith fixed on the casing. Above the external screw threads in the outer side of the lateral wall, an encircling snap ring groove is provided in which an O-ring is arranged as a medium for sealing. Further, at one point on the lid below the snap ring groove, there is an opening running radially along the longitudinal axis crosswise, through which the inner sides of the bowl-shaped lid are interconnected with its outside.

This lid is fabricated from a relatively thick-walled material whereby the bottom of the lid bulges slightly outward as a whole, so as to give the lid adequate stability if the filter housing is exposed to overpressure in course of its operation. Since the lateral wall of the lid is connected with the container wall only through the external screw. Threads anyway, a certain elasticity of the lateral wall is ensured, which does not lead to leakages due to the additional sealing at the upper section of the lateral wall.

The task of the present invention is to prolong the service life of the filter cartridge with durably fastened lids.

This task is solved with a filter cartridge, which is characterized in that the lid bottom merges with the lateral wall in the direction of the peripheral wall along a curved edge section, in which the curved edge section and the strip-shaped lateral wall join in the area with matching form in a common, pointed, inward-oriented wall section.

The invention is based on the knowledge that the forces $F_D$ acting on the lid bottom due to the internal pressure result in a tensile force $F_z$ acting in the area of the common wall section, which has, due to the curvature of the edge section, a major force component parallel to the lateral wall and, at the best only a small, inward oriented, force component perpendicular to the lateral wall. This means that the area of the lateral wall fastened with the peripheral wall is also exposed to tension only along the lateral wall and the peripheral wall, as a result of which the danger of a shear fracture is minimized at the lower end of the fastening area.

Another advantage of the curved edge section is that the forces acting on the lid due to the internal pressure can not only be weakened in the edge area, but can also be used for generating a sealing force. Due to the fact that the lateral wall and the curved edge section of the lid bottom form a common wall section in the interior of the filter cartridge, the force component F, acting due to the internal pressure on the common wall section, is radially outward oriented so that the common wall section is pressed against the peripheral wall of the cartridge container. Thereby, it is of advantage if the common wall section forms the lower wall section of the lateral wall.

On the whole, the load is clearly reduced in the critical area of the peripheral wall at the lower end of the fastening area, so that the leakages are effectively prevented in that area and the service life of the filter cartridge is limited mainly due to the consumption of the filter material.

Preferably, the lateral wall connects with the curved edge section tangentially. Preferably, the lateral wall has a form matching with that of the curved edge section.

The inward oriented force component of the tensile force, which acts on the lateral wall and on the peripheral wall, is reduced further due to the tangential orientation. In the outer side of the lid, a wedge-shaped ring space is built in the edge area. It was found that it is enough, if the curved wall section extends up to the inner end of the strip-shaped lateral wall.

It was also found that greater the radius of curvature of the curved edge section, more favorable is the force distribution, whereby the upper limit is given by the dimensions of the cartridge container. Preferably, the curved edge section has a mean radius of curvature R, which satisfies $R \geq 3 \times S$, in particular $R \geq 5 \times S$, whereby S denotes the thickness of the wall of the peripheral wall.

Preferably the curved edge section has an angle α between 80° and 100°. α indicates the angle which spans the curvature radius R. The curved edge section has an essentially vertical section at one end in the area of the common wall section and merges into an essentially horizontal lid bottom section at the other end. The range of the angle α from 80° to 100° takes into account the inclination of the peripheral wall with respect to the bottom wall of the cartridge container. If the cartridge container is extended conically upward for instance, which represents a more preferable version as such, the angle α lies then preferably in the range of 90° to 100°.

In an advantageous embodiment, the lateral wall has an upper wall section, which extends from the common wall section upward at least up to the height of the lid bottom. On one hand, the area of support of the strip-shaped lateral wall is increased by it, and, on the other hand, an area of support for a back-up ring, which can be mounted on the lid, is created. In addition, this upper wall section serves the purpose of enabling gripping and holding the lid by means of a gripping tool, while inserting the cartridge and fitting it on the cartridge wall.

By providing a back-up ring, which is arranged between the cartridge lid and the lid of the outside container, the cartridge lid can be designed with a thinner wall, because the pressure exerted on the inside of the cartridge lid is practically transmitted through the back-up ring to the lid of the outside container. Since the back-up ring is reusable, but the lid as well as the filter cartridge must be disposed of later as wastes, costs for the lid material can thus be saved.

Preferably the bottom contour of the back-up ring is built essentially with a form complementary to the outside contour of the lid, so that the lid can help support the back-up ring when exposed to compressive stress.

In pressureless condition, the back-up ring does not completely fill the wedge-shaped ring area. It is of advantage, if there is a slit-shaped recess between the back-up ring and at least one section of the curved edge section adjacent to the common wall section. This slit-shaped recess can extend up to the horizontal end of the curved edge section. Thus the idea of the essentially complementary form is to be understood taking into account this slit-shaped recess.

Providing such a recess is of advantage, because otherwise the outside area of the lid would be subject to friction on the lower side of the back-up ring when exposed to the pressure impacts and hence would damage the lid in the long run. In the edge area of the lid, that is, in the wedge-shaped ring area, this would lead to a disadvantageous notch effect. Due to the large pressures, the lid material can reach the zone of the yielding point. Thus, this recess is provided so that in the case of plastic deformation, a portion can be pushed into this recess. This means that the support to the full area of the lower side of the lid can be provided only if it is exposed to extreme pressure.

The lid can be joined with the peripheral wall of the cartridge container, for example, by means of adhesive bonding or welding. Preferably, however, laser welding is used, because with that the desired section of the lateral wall can be welded with the peripheral wall with greater precision. Thereby, at least one section of the common wall section is laser welded with the peripheral wall of the cartridge container. It was found that the entire width of the lateral wall need not be welded with the peripheral wall of the cartridge container in order to achieve adequate stability. It is advantageous if the welded area extends up to the lower end of the common wall section.

To enable laser welding, the material of the cartridge container is transparent to the laser light and the material of the lateral wall of the lid is absorptive to the laser light. Thereby it is adequate if the material of the lateral wall in the cartridge lid only is absorptive to the laser light.

Exemplary embodiments of the invention are explained in detail with the help of the following Figures.

Figure 1:
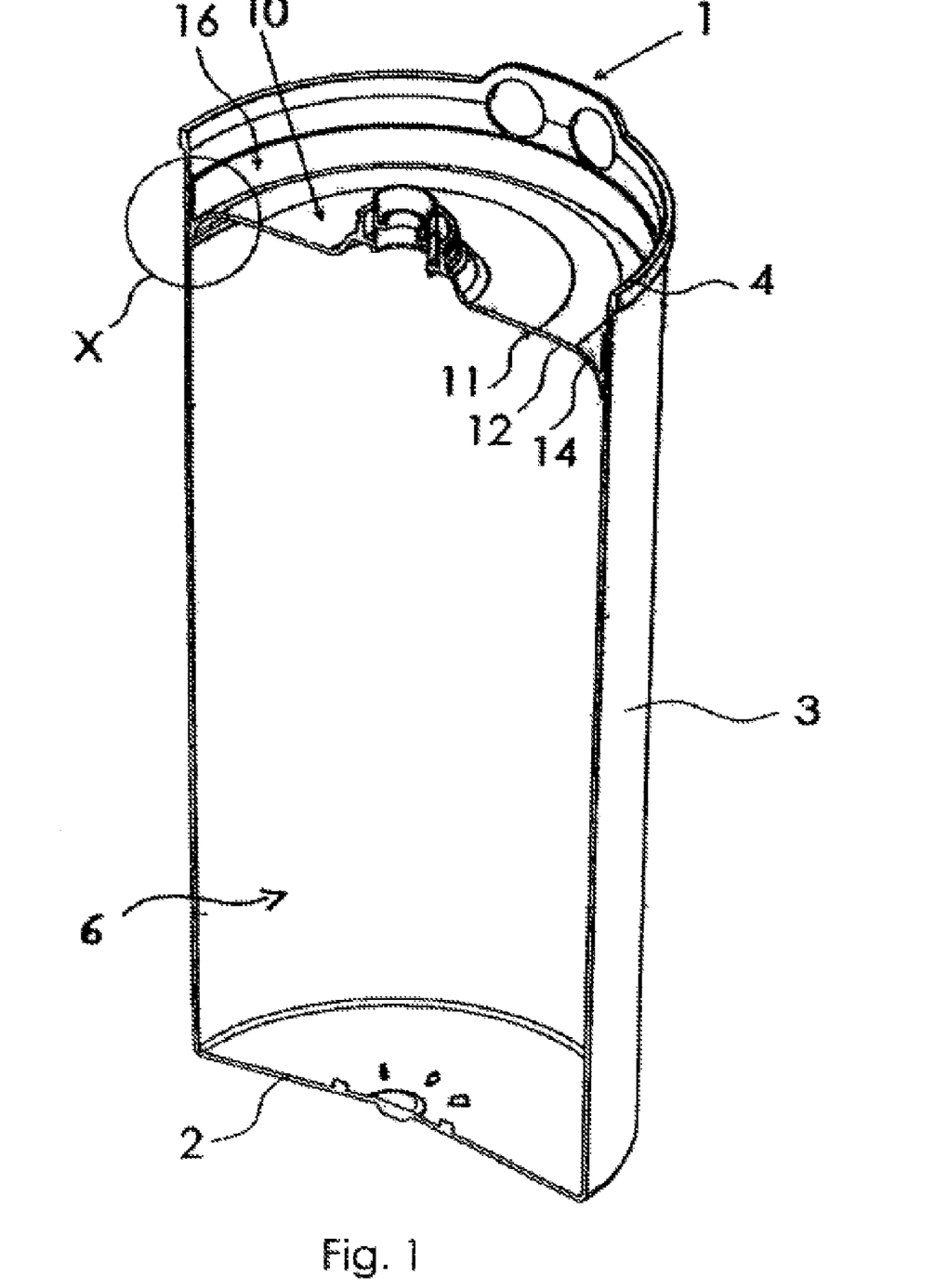
FIG. 1 A section of a filter cartridge in perspective view.

In FIG. 1, a vertical section view of a filter cartridge 1 is shown with a cartridge container 6, bottom wall 2, peripheral wall 3 and opening border 4. The filter material within the filter cartridge is not shown. The peripheral wall 3 is designed conically in this embodiment. A cylindrical peripheral wall is also possible.

In the interior of the cartridge container, the cartridge lid 10 is inserted with clearance to the opening border 4. The cartridge lid 10 has a lid bottom 11, which has, except for the central area, essentially a horizontal middle part 12 and a curved edge section 14, for which further explanation is given in connection with FIGS. 2a, b.

Figure 2A:
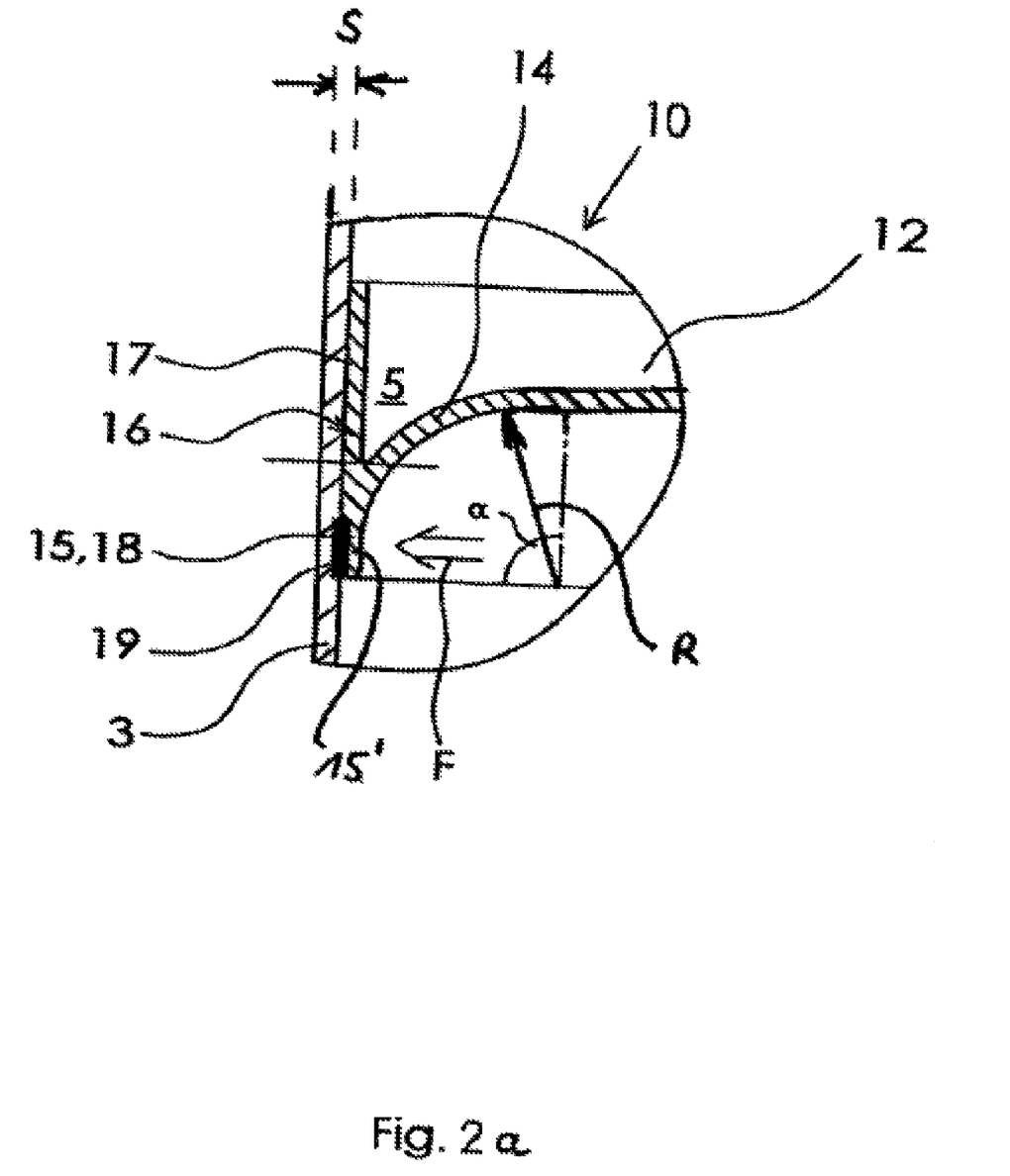
FIG. 2a, b Magnified views of the detail X.
Figure 2B:
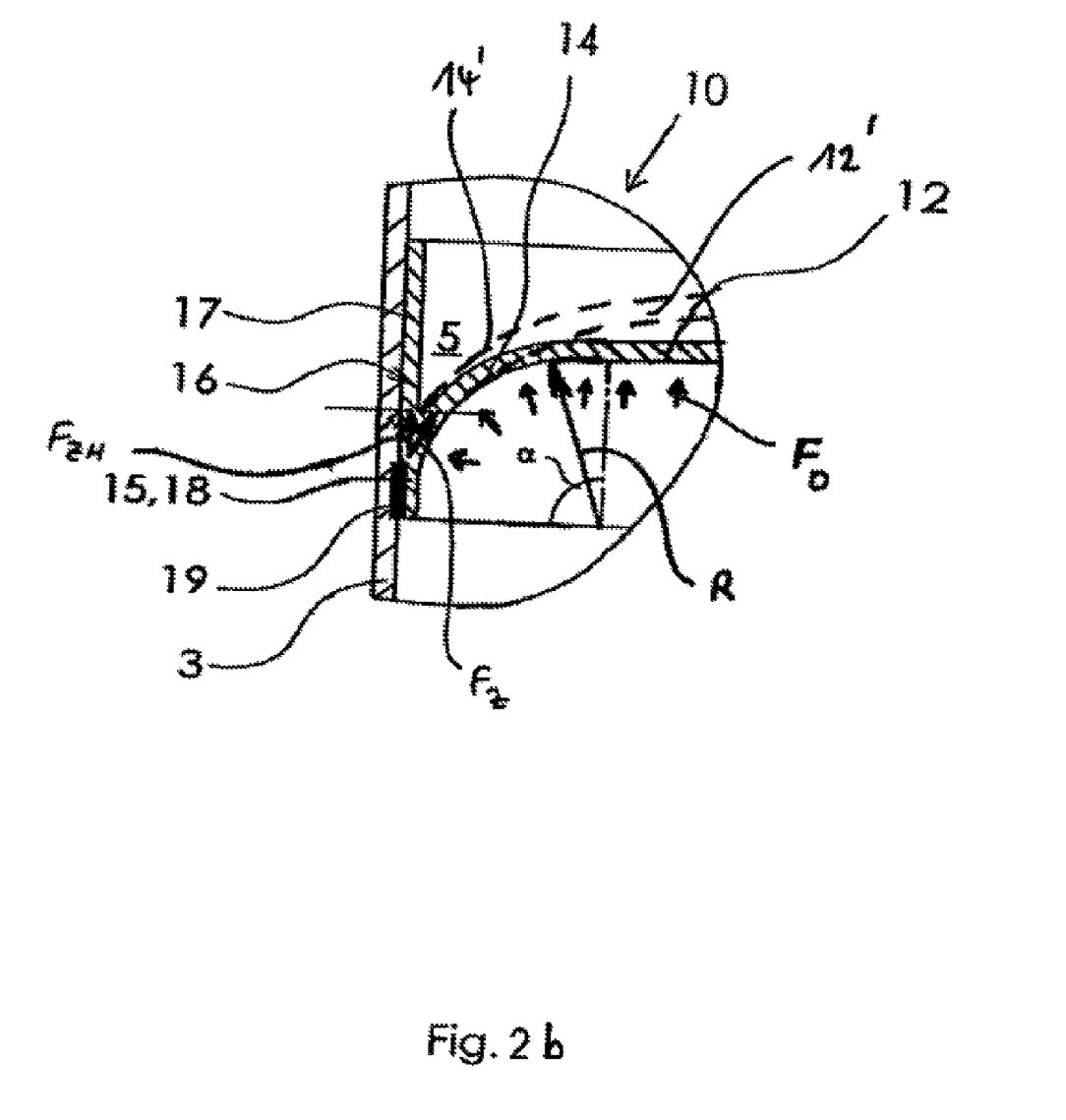

In FIG. 2a, the detail X is shown with magnification. It can be seen that the horizontal middle part 12 merges in the direction of the peripheral wall 3 with the curved edge section 14, which extends into the interior of the filter cartridge and joins its vertical section 15' with the lateral wall 16 in the common wall section 15. The strip-shaped lateral wall 16 has an upper lateral wall section 17 and a lower lateral wall section 18, whereby the lower lateral wall section 18 is identical with the common wall section 15. This common wall section 15 tapers downward to a pointed tip.

The curved wall section 14 is so strongly curved that it turns up to the vertical direction, that is the lateral wall 16 is shaped tangentially along the curved edge section 14. The lateral wall 16 extends almost parallel to the peripheral wall 3.

The curved edge section 14 is characterized by the curvature radius R, which, in the example shown here, amounts to approximately $7 \times S$, whereby S indicates the thickness of the wall of the peripheral wall 3. The angle α indicates the region spanned by the radius of curvature R, whereby R can also be the mean radius of curvature. The curved edge section 14 is spanned by the angle α of approximately 90°.

The peripheral wall 3 can be built with conical form and forms an obtuse angle with the bottom wall (not shown here).

The upper wall section 17 extends upward across the horizontal middle part 12, whereby a ring area 5 with a wedge-shaped cross section is formed between the upper lateral wall section 17 and the curved edge section 14. The wedge-shaped ring area 5 is spanned by an acute angle, preferably of 40°-50°.

The common wall section 15 is welded, in particular laser welded, with the peripheral wall 3 in the area 19. The diameter of the lid is preferably fabricated with excess dimensions, so that the wall section 15 is further pressed against the peripheral wall 3 during the welding. This initial compression is especially advantageous in the laser welding for achieving a homogeneous weld. This area 19 extends upward from the lower tip of the common wall section 15, whereby it is sufficient that this welded area 19 does not span the entire width of the lower lateral wall section 18.

The force generated by the internal pressure is denoted, for example, by arrow F. It can be seen that the inside pressure presses on the common wall section 15 and thus exerts an additional sealing force, especially in the weld section 19.

FIG. 2b corresponds to FIG. 2a, whereby additionally, the lid, bulged by the force $F_D$ acting on the inside, is shown with broken lines. The middle part 12 and the curved edge section 14 are pressed upward and assume the positions 12', 14', which lead to the tensile forces $F_z$, who have their main component $F_{ZH}$ in the common wall section 15 parallel to the lateral wall 16. Due to this, only a small, inward oriented force acts on the welded section 19, which reduces the risk of shear fracture under the action of pressure impacts in the predamaged critical area of the peripheral wall 3 at the lower ends of the welding joints.

Figure 3:
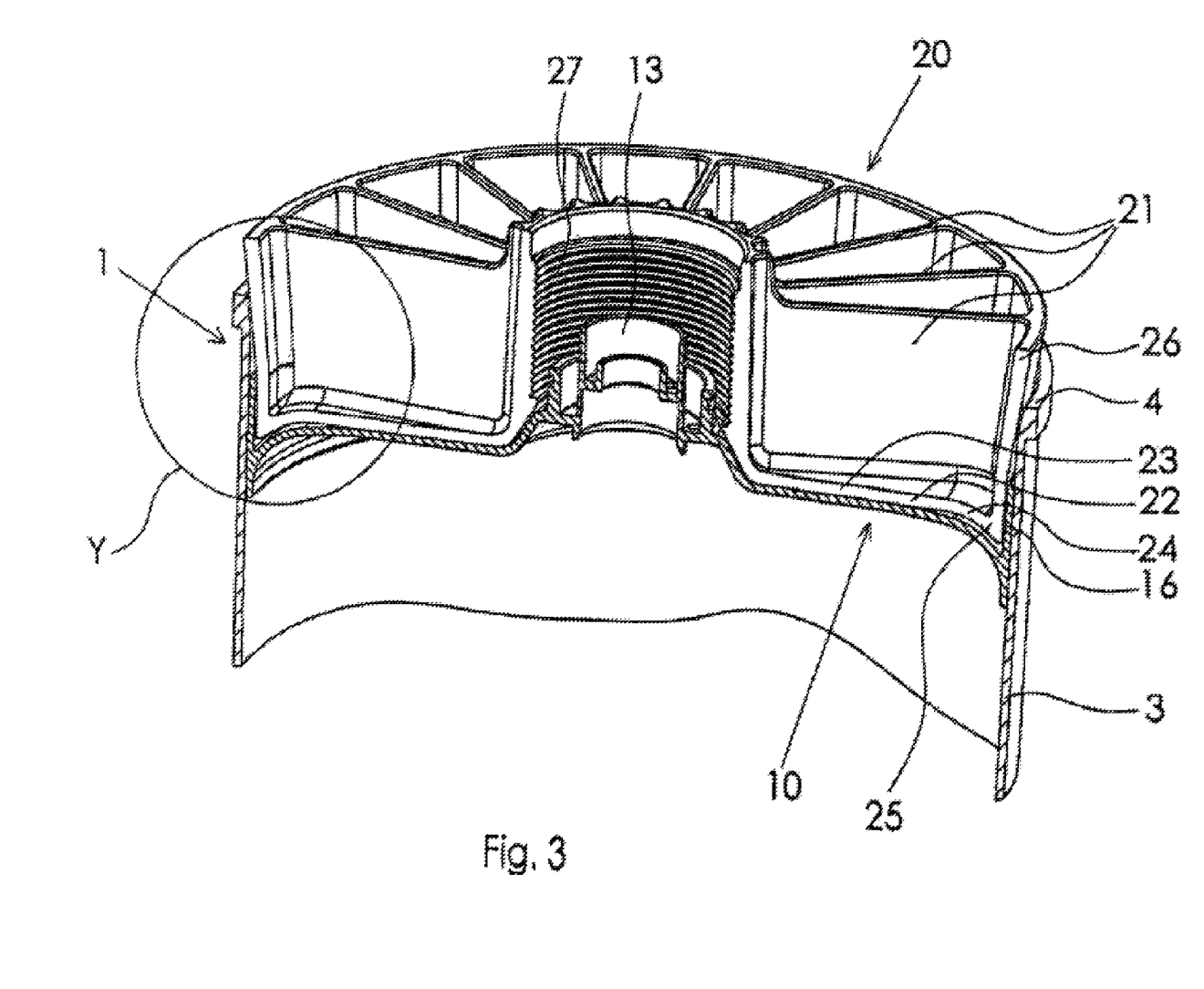
FIG. 3 A section of the upper area of the filter cartridge with a back-up ring, and FIG. 4 A magnified view of the detail Y in FIG. 3.

In FIG. 3, the filter cartridge with the back-up ring 20 described in the FIGS. 1 and 2 is shown. The complete lid 10 is shown in the drawing and has a connecting tube 13 at the center. Accordingly, the back-up ring 20 also has a ring opening 27 at its center, so that these connecting tubes 13 are freely accessible from above.

The back-up ring 20 has radial reinforcing ribs 21, which are connected with each other by a common back-up ring bottom 22 in the lower area and with a common back-up ring wall 26 in the outside border area. The contour of the back-up ring bottom 22 has a design almost complementary to the outside contour of the lid 10, whereby the lateral wall 26 of the back-up ring 20 fits closely with the lateral wall 16.

Figure 4:
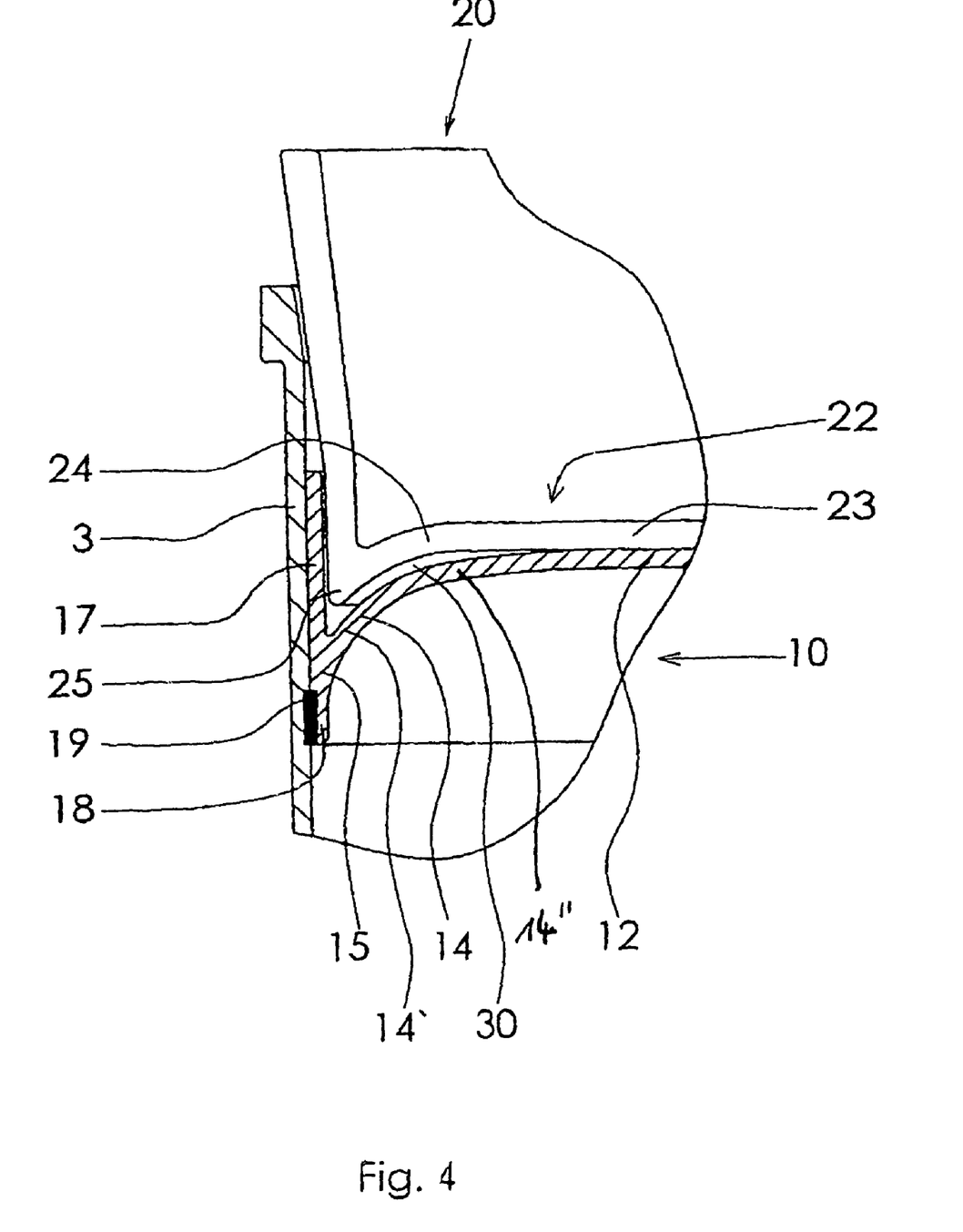

A magnified view of the detail Y is shown in FIG. 4. A slit-shaped ring area 30 is formed in the area of the wedge-shaped ring area above the curved edge section 14, especially above the upper section 14" of the curved edge section 14 of the lid 10. This is achieved, by means of the layout, such that the tip border 25 of the tapering curved bottom section 24 of the back-up ring bottom 22 does not extend completely up to the ring area 5 and the curved section 24 of the back-up ring bottom 22 has a lesser radius of curvature compared to the curved edge section 14. This different radius of curvature leads to it that in the horizontal section 23 of the back-up ring bottom 22, it fits closely at the horizontal middle part 12 of the lid bottom. As illustrated in FIGS. 2a, 2b, 3 and 4, the lateral wall 16 is in contact with the peripheral wall 3 along the entire length of the lateral wall 16.

REFERENCE SYMBOLS

1 Filter Cartridge
2 Bottom Wall
3 Peripheral Wall
4 Opening Border
5 Wedge-shaped Ring Area
6 Cartridge Container
10 Lid
11 Lid Bottom
12 Horizontal Middle Part
12' Horizontal Middle Part
13 Connecting Pipe
14 Curved Edge Section
14' Position Lower Section
14" Upper Section
15 Common Wall Section
15' Vertical Section
16 Lateral Wall
17 Upper Lateral Wall Section
18 Lower Lateral Wall Section
19 Welded Section
20 Back-up Ring
21 Radial Reinforcement Rib
22 Back-up Ring Bottom
23 Horizontal Section
24 Curved Section
25 Tip Border
26 Back-up Ring Wall
27 Ring Opening
30 Slit-shaped Recess

The invention claimed is:

1. A filter cartridge with a filter material, comprising: a cartridge container with a bottom wall and a peripheral wall and a lid, which shuts the cartridge container, comprised of a lid bottom and a strip-shaped lateral wall having a length measured parallel to the peripheral wall and having a linear vertical cross section along the entire length of the lateral wall, wherein the lateral wall is fitted at the inner side of the peripheral wall and the lateral wall is in contact with the peripheral wall along the entire length of the lateral wall, wherein the lid bottom merges with the lateral wall in the direction of the peripheral wall along a first end of an inward curved edge section, wherein the first end of the curved edge section and the lateral wall join in a common wall section, tapering inwards, in a forming region, wherein a lower end of the common wall section is parallel to the cartridge container peripheral wall adjacent thereto, and wherein the lateral wall has an upper wall section which is connected to and extends upward from the common wall section that is parallel to the common wall section lower end and cartridge container peripheral wall adjacent thereto, wherein glue or a weld connects at least one section of the common wall section to the peripheral wall, and wherein the curved edge section has a second end that merges into an essentially horizontal lid bottom middle section.

2. The filter cartridge as claimed in claim 1, wherein in vertical cross section the lateral wall is a linear tangent line, and wherein the lateral wall is connected with the curved edge section tangentially.

3. The filter cartridge as claimed in claim 2, wherein the common wall section forms a lower wall section of the lateral wall that includes the lower end.

4. The filter cartridge according to claim 3, wherein the curved edge section has a mean edge radius of curvature R, which satisfies $R \geq 5 \times S$, wherein S indicates the thickness of the peripheral wall of the cartridge container.

5. The filter cartridge as claimed in claim 1, wherein the common wall section forms a lower wall section of the lateral wall that includes the lower end.

6. The filter cartridge according to claim 1, wherein the curved edge section extends up to the inner end of the strip-shaped lateral wall.

7. The filter cartridge according to claim 1, wherein the curved edge section has a mean edge radius of curvature R, which satisfies $R \geq 5 \times S$, wherein S indicates the thickness of the peripheral wall of the cartridge container.

8. The filter cartridge according to claim 1, wherein the curved edge section spans an angle $\alpha$ from 80° to 100°.

9. The filter cartridge according to claim 8, wherein the lateral wall upper wall section extends upward from the common wall section at least up to height of the lid bottom.

10. The filter cartridge according to claim 1, wherein the lateral wall upper wall section extends upward from the common wall section at least up to height of the lid bottom.

11. The filter cartridge according to claim 10, wherein the upper wall section of the lateral wall and the curved edge section border on their outer side forming a ring space with a wedge-shaped cross section.

12. The filter cartridge according to claim 11, further comprising a back-up ring arranged on the lid, wherein the back-up ring has an inner wall comprising a ring opening, an outer lateral wall in contact with the lid lateral wall, and a plurality of radial reinforcing ribs connected to and extending between the back-up ring inner wall and back-up ring outer lateral wall.

13. The filter cartridge according to claim 1, further comprising a back-up ring arranged on the lid, wherein the back-up ring has an inner wall comprising a ring opening, an outer lateral wall in contact with the lid lateral wall, and a plurality of radial reinforcing ribs connected to and extending between the back-up ring inner wall and back-up ring outer lateral wall.

14. The filter cartridge according to claim 13, wherein at least a bottom contour of the back-up ring is connected to the back-up ring inner wall and the back-up ring outer lateral wall and is built such that the bottom contour is complementary to an outer contour of the lid.

15. The filter cartridge according to claim 13, wherein the lid includes a connecting tube at its center that is connected to the essentially horizontal lid bottom middle section, and wherein the connecting tube is accessible through the ring opening of the back-up ring.

16. The filter cartridge according to claim 15, wherein the radial reinforcing ribs are connected with each other by a back-up ring bottom extending between the back-up ring inner wall and back-up ring outer lateral wall, and the filter cartridge further comprising a slit-shaped recess between the back-up ring bottom and a portion of the curved edge section bordering on the common wall section.

17. The filter cartridge according to claim 1, wherein the material of the cartridge container is transparent to laser light and at least the material of the lateral wall of the lid is absorptive to laser light.

18. The filter cartridge according to claim 1, wherein the curved edge section has an essentially vertical section at one end in an area of the common wall section.

19. A filter cartridge with a filter material, comprising:
a cartridge container with a bottom wall and a peripheral wall and a lid, which durably shuts the cartridge container, comprised of a lid bottom and a strip-shaped lateral wall having a linear vertical cross section, with a form matching according to its border, which is fitted at the inner side of the peripheral wall, whereby the lid bottom merges with the lateral wall in the direction of the peripheral wall along an inward curved edge section, whereby the curved edge section and the lateral wall join in a common wall section, tapering inwards, in a forming region, wherein a lower end of the common wall section is parallel to the cartridge container peripheral wall adjacent thereto, wherein the lateral wall has an upper wall section which extends upward from the common wall section that is parallel to the common wall section lower end and cartridge container peripheral wall adjacent thereto, a back-up ring arranged on the lid, wherein the back-up ring has an inner wall comprising a ring opening, an outer lateral wall in contact with the lid lateral wall, and a plurality of radial reinforcing ribs extending between the back-up ring inner wall and back-up ring outer lateral wall, wherein at least a bottom contour of the back-up ring is connected to the back-up ring inner wall and the back-up ring outer lateral wall and is built such that the bottom contour is complementary to an outer contour of the lid, wherein the back-up ring does not fill a wedge-shaped ring area between the bottom contour and the lid completely, and wherein the radial reinforcing ribs are connected with each other by a back-up ring bottom contour extending between the back-up ring inner wall and back-up ring outer lateral wall.

20. A filter cartridge with a filter material, comprising:
a cartridge container with a bottom wall and a peripheral wall and a lid, which durably shuts the cartridge container, comprised of a lid bottom and a strip-shaped lateral wall having a linear vertical cross section, with a form matching according to its border, which is fitted at the inner side of the peripheral wall, whereby the lid bottom merges with the lateral wall in the direction of the peripheral wall along an inward curved edge section, whereby the curved edge section and the lateral wall join in a common wall section, tapering inwards, in a forming region, wherein a lower end of the common wall section is parallel to the cartridge container peripheral wall adjacent thereto, and wherein the lateral wall has an upper wall section which extends upward from the common wall section that is parallel to the common wall section lower end and cartridge container peripheral wall adjacent thereto, a back-up ring arranged on the lid, wherein the back-up ring has an inner wall comprising a ring opening, an outer lateral wall in contact with the lid lateral wall, and a plurality of radial reinforcing ribs connected to and extending between the back-up ring inner wall and back-up ring outer lateral wall, and a slit-shaped recess between the back-up ring and a position of the curved edge section bordering on the common wall section.

21. The filter cartridge according to claim 20, wherein a welded area derived from a laser connects at least one section of the common wall section to the peripheral wall.

22. A filter cartridge with a filter material, comprising:
a cartridge container with a bottom wall and a peripheral wall and a lid, which shuts the cartridge container, comprised of a lid bottom and a strip-shaped lateral wall having a length measured parallel to the peripheral wall and having a linear vertical cross section along the entire length of the lateral wall, wherein the lateral wall is fitted at the inner side of the peripheral wall and the lateral wall is in contact with the peripheral wall along the entire length of the lateral wall, wherein the lid bottom merges with the lateral wall in the direction of the peripheral wall along a first end of an inward curved edge section, wherein the first end of the curved edge section and the lateral wall join in a common wall section, tapering inwards, in a forming region, wherein a lower end of the common wall section is parallel to the cartridge container peripheral wall adjacent thereto, wherein the lateral wall has an upper wall section which is connected to and extends upward from the common wall section that is parallel to the common wall section lower end and cartridge container peripheral wall adjacent thereto, wherein in the vertical cross-section, the lateral wall is a linear tangent line, and wherein the lateral wall is connected with the first end of the curved edge section tangentially, wherein glue or a weld connects at least one section of the common wall section to the peripheral wall, and wherein the curved edge section has a second end that merges into an essentially horizontal lid bottom middle section.

23. The filter cartridge according to claim 22, wherein the curved edge section has an essentially vertical section at one end in an area of the common wall section.

24. A filter cartridge with a filter material, comprising:
a cartridge container with a bottom wall and a peripheral wall and a lid, which shuts the cartridge container, comprised of a lid bottom and a strip-shaped lateral wall having a length measured parallel to the peripheral wall and having a linear vertical cross section along the entire length of the lateral wall, wherein the lateral wall is fitted at the inner side of the peripheral wall and the lateral wall is in contact with the peripheral wall along the entire length of the lateral wall, wherein the lid bottom merges with the lateral wall in the direction of the peripheral wall along an inward curved edge section, wherein the curved edge section and the lateral wall join in a common wall section, tapering inwards, in a forming region, wherein a lower end of the common wall section is parallel to the cartridge container peripheral wall adjacent thereto, and wherein the lateral wall has an upper wall section which is connected to and extends upward from the common wall section that is parallel to the common wall section lower end and cartridge container peripheral wall adjacent thereto, and wherein the curved edge section consists of a single curved portion having a radius of curvature R, wherein glue or a weld connects at least one section of the common wall section to the peripheral wall, and wherein the curved edge section has an essentially vertical section at one end in an area of the common wall section and immediately merges into an essentially horizontal lid bottom middle section at a second end.

* * * * *